(12) United States Patent
Link et al.

(10) Patent No.: US 7,836,672 B2
(45) Date of Patent: Nov. 23, 2010

(54) REMOTE CONTROL SYSTEM AND APPARATUS FOR ENABLING ACCESSING THE INTERIOR OF A CHAMBER OF A HARVESTER

(75) Inventors: John F. Link, Calumet City, IL (US); Michael J. Covington, Germantown, TN (US); George H. Hale, Arlington, TN (US)

(73) Assignee: CNH America LLC, New Holland, PA (US)

( * ) Notice: Subject to any disclaimer, the term of this patent is extended or adjusted under 35 U.S.C. 154(b) by 647 days.

(21) Appl. No.: 11/825,875

(22) Filed: Jul. 10, 2007

(65) Prior Publication Data

US 2009/0013661 A1 Jan. 15, 2009

(51) Int. Cl.
*A01D 43/02* (2006.01)
(52) U.S. Cl. .......................................................... 56/341
(58) Field of Classification Search .................... 56/341; 100/88
See application file for complete search history.

(56) References Cited

U.S. PATENT DOCUMENTS

| | | | |
|---|---|---|---|
| 3,990,739 A | 11/1976 | Head | 295/56 |
| 4,655,634 A * | 4/1987 | Loy et al. | 404/84.05 |
| 4,836,809 A | 6/1989 | Pelligrino | 440/2 |
| 4,880,346 A | 11/1989 | Brassette | 414/486 |
| 4,969,318 A | 11/1990 | Hudson et al. | 56/10.2 |
| 5,065,569 A | 11/1991 | Schlueter | 56/16.6 |
| 5,092,422 A | 3/1992 | Hood, Jr. et al. | 180/329 |
| 5,439,343 A | 8/1995 | Watson | 414/744.3 |
| 5,701,966 A | 12/1997 | Amico | 180/7.2 |
| 5,731,974 A | 3/1998 | Pietzsch et al. | 364/188 |
| 5,816,741 A | 10/1998 | Troppman, III | 404/117 |
| 6,272,825 B1 * | 8/2001 | Anderson et al. | 56/341 |
| 6,530,199 B1 * | 3/2003 | Covington et al. | 56/16.6 |
| 6,734,647 B2 * | 5/2004 | Wakitani et al. | 318/432 |
| 6,991,221 B1 | 1/2006 | Rodriguez | 254/423 |

* cited by examiner

*Primary Examiner*—Alicia M Torres
(74) *Attorney, Agent, or Firm*—Michael G. Harms; Patrick M. Sheldrake

(57) ABSTRACT

A remote control system and apparatus enabling safely accessing the interior of a cotton compacting chamber and other regions of a cotton harvester, and also operating aspects of the compacting apparatus contained therein and thereabout, and which system is optionally operable for operating other aspects of the harvester, for inspection, maintenance and/or service, as well as other purposes. The system requires initial steps, including to safely neutralize or lock out operating systems of the harvester, then enables accessing designated interior locations of the compactor and the ability to operate systems therein, including aspects of the compacting apparatus.

6 Claims, 11 Drawing Sheets

REMOTE CONTROL SYSTEM AND APPARATUS FOR ENABLING ACCESSING THE INTERIOR OF A CHAMBER OF A HARVESTER

TECHNICAL FIELD

This invention relates generally to a remote control system and apparatus for accessing the interior of a chamber and other regions of an agricultural harvester, such as the cotton compacting chamber of a cotton harvester, and, more particularly, to a system and apparatus which enables safely gaining access to the interior of the compacting chamber, and also operating aspects of the compacting apparatus contained therein and thereabout, and which is optionally operable for operating other aspects of the harvester, for inspection, maintenance and/or service, as well as other purposes.

BACKGROUND ART

Currently, known cotton harvesters equipped with either a conventional basket type cotton receiver or holding chamber, or newer on-board module builder systems, typically include an operator presence system. Such operator presence systems typically include a seat switch, which disables the functions of the cotton harvester's harvesting units under certain conditions, which typically include the transmission of the harvester being in neutral, the engine at idle, the parking brake engaged, and the operator leaving the seat for any reason. In some known systems, prior to leaving the cab, the operator can use a tether engage switch which will allow the operator to connect a connector cord of a remote tether control handle to an outlet on one of the cotton harvester's harvesting units, which connects the control handle to a drive mechanism of the harvesting units to allow the operator to slowly turn the harvesting units rotors by operating a control switch on the control handle. When the control switch is released, the harvesting unit's rotors will stop turning. This allows the operator to visually inspect each of the picking bars and spindles of the rotor or rotors on each of the harvesting units.

Cotton harvesters equipped with a conventional basket system typically have a cotton-holding chamber within the basket structure, into which chamber cotton is blown into during harvest. Such basket systems typically include an unloading door on the left side of the basket, which door forms the lower side of the cotton-holding chamber's left side wall when the door is closed. Also typically located within the cotton-holding chamber is a compactor structure having rotating augers, the compactor structure being capable of being pivoted downwardly to increase the holding chambers capacity by pressing down on the cotton inside the chamber and moving it rearward with the augers. When the cotton-holding chamber is full, the cotton will then be unloaded from within the holding chamber by vertically raising the basket, opening the side door to a horizontal position, and operating unloading chains on the floor and door for moving the cotton. The cotton is moved by the unloading chains horizontally from within the holding chamber onto the door, and falls off the end of the door into a receiver, which can be, for instance, a boll buggy or a stationary module builder. A stationary module builder is then operable for further processing the cotton before being transported to the cotton gin.

Cotton harvesters equipped with an on-board module builder system have a cotton module-forming chamber within the module builder structure into which cotton is blown into during harvest. The module builder will typically have a primary unloading door at the rear which, when in its closed position, forms the lower rear wall of the cotton module-forming chamber. Also within the module-forming chamber is a vertically moving compacting structure with rotating augers that is used to form the module of cotton within the chamber by distributing the cotton front to rear, and pressing the cotton down against the chamber floor to increase the cotton's density. Reference in this regard, Covington, et al., U.S. Pat. No. 6,682,417, issued Jan. 27, 2004.

When the cotton module-forming chamber has a completed cotton module, the module builder structure, as illustrated and explained in the above referenced Covington et al., U.S. Pat. No. 6,682,417, is tilted about the rear of the cotton harvester while at the same time, the primary and secondary unloading doors are opened, so as to form at the top tilted position, a continuous surface from the cotton module-forming chamber's floor and the top surface of the primary and secondary doors to the ground at an angle of 15 to 20 degrees. The unloading chains for the cotton module-forming chamber and the primary and secondary doors are then engaged and the module is moved out of the cotton module-forming chamber over the primary and secondary doors and onto the ground as the machine is moved forward. The cotton module requires no further processing other than transport to the cotton gin.

On cotton harvesters equipped with either a conventional basket system, or a newer on-board module builder system, it is necessary to gain access to the interior of the cotton-holding chamber or the module-forming chamber for inspection, maintenance, or service. For example, during harvest, cotton that is blown into the interior of the cotton holding or the module-forming chamber will typically contain amounts of small leaf trash, some of which will separate from the cotton and settle into the corners, crevasses, and ledges of the interior. Some of this leaf trash does not leave the interior during the normal unloading of the cotton from the basket, or the module from the on-board module builder. Also, cotton that is blown into the interior of the cotton-holding chamber or the module-forming chamber can contain small cotton filaments commonly referred to as linters, that separate from the cotton and cling to the sides of the interior walls and roof or edges of the compactor apparatus within the chamber. Some of these linters will also remain in the chamber after the cotton is unloaded.

Some governments require that, as a disease protection measure, a cotton harvester be cleaned and fumigated prior to entering from another jurisdiction or area where it has harvested cotton. Seed companies have contracted with some cotton farms to grow certain varieties of cotton on test fields for research purposes or certain varieties for seed. When moving the cotton harvester from a normal variety field that has been harvested to a test or seed field, it is imperative to clean the machine, especially the interior of the cotton-holding chamber or module-forming chamber, prior to relocating so as not to introduce contaminates into the cotton from these fields. Cotton producers that practice good maintenance will clean the interior of the cotton-holding chamber or module-forming chamber on a daily basis. It is also recommended to periodically inspect or service the unloading chains, walls, floor, roof, and the compactor structure and its augers in the interior of the cotton-holding chamber or module-forming chamber.

For the above reasons, it is necessary from time to time to gain access to the interior of the cotton-holding chamber on a harvester equipped with a conventional basket system, and to the interior of the module-forming chamber on a cotton harvester equipped with the newer on-board cotton module builder system.

On some cotton harvesters equipped with a conventional basket system, there are two two-position switches located on an operator console within the operator cab, operable to put the basket in the unloading position. One of the switches, referred to as a basket raise/lower switch, is operable for raising the basket up to its unloading height, and to lower it to its harvest position. Another of the switches is a door open/close switch operable to open the door to its horizontal unloading position, and close the door to its harvest position. Each switch can be used independent of the other.

To gain access to the interior of the cotton-holding chamber on cotton harvesters equipped with a known conventional basket system, the operator can open the unloading door to its horizontal position by depressing the door open/close switch. Since the basket raise switch is not depressed, the basket will stay in its down position and the door will open outward to a horizontal position. Access to the interior of the cotton-holding chamber can be made from the ground using a utility ladder to climb and step onto the floor of the unloading door, or by stepping from the machine's service platform to a small platform on the front side of the unloading door and then onto the floor of the door. From the floor of the unloading door, the interior of the cotton-holding chamber can be accessed through the side opening made by the unloading door being in the open position. Inspection, maintenance, and service can then be performed from the interior of the cotton-holding chamber.

It should be noted here that on cotton harvesters with a conventional basket system, the compactor structure and its rotating augers can be cleaned, inspected, and serviced from its raised position. Since there is no need to pivot the compactor structure down, the operator can turn the machine off after the door is opened prior to accessing the interior of the cotton-holding chamber. There is no need to engage the operator presence system as long as the machine is turned off or engage the tether switch since the remote tether will not be used. After the work has been performed with in the interior of the cotton-holding chamber, the operator can return to the cab, start the machine, and close the unloading door.

On cotton harvesters equipped with the newer known on-board module builder system, such as illustrated and disclosed in the above referenced Covington et al., U.S. Pat. No. 6,682,417, typically there is an unload/harvest switch on the operator console within the operator cab, that is a two-position detent switch that controls the activation or deactivation of certain functions on the module builder system depending on whether the switch is set to the unload mode or harvest mode. When this switch is set to the harvest mode, a module forming computer program that controls the module compactor structure and the distribution augers attached to it, is activated, and the module builder structure's tilt and rear unloading door opening sequence along with the unloading chains are deactivated and the switches for these functions, are disabled. When the unload/harvest switch is moved to the unload position, the module compactor structure with the augers will automatically move to its top position, the module builder structure's tilt and unloading door opening sequence is activated, and the unloading chains operated.

Problems in gaining access to the module-forming chamber encountered with the known on-board module builder systems include that to open the rear unloading doors without tilting the module builder structure, the module builder's tilt cylinder raise function must be disabled. Then, to lower the module compactor structure for accessing it, the operator must place the unload/harvest switch in harvest mode with the machine running. The operator must then quickly turn the machine off so that the compactor will stay in the lowered position. This procedure is a time consuming and cumbersome operation.

Thus what is sought is a simple and easy means of opening the doors of a cotton harvester equipped with an on-board module builder system without tilting the module builder structure so as to gain access to the interior of the module-forming chamber for inspection, maintenance, or service. What is also sought is a simple and easy means of lowering the module compactor structure when the primary unloading door is in its open position for inspection, maintenance, or service of apparatus thereof, including the auger drive and auger mounting mechanism of the compactor structure.

SUMMARY OF THE INVENTION

What is disclosed is the use of the operator presence system of a harvester in conjunction with a remote tether control system, to activate from a remote location, an unloading door opening sequence without activating the module builder tilting function in order to gain access to the interior of the module-forming chamber for the purpose of inspection, maintenance, or service. Also disclosed is the use of the system to activate from a remote location the lowering or raising of the module compactor apparatus after the primary and secondary unloading door opening sequence has been performed in order to gain access to the components thereof, such as, but not limited to, the auger drive and mounting mechanism's inspection panels for the purpose of inspection, maintenance, and service.

According to a preferred aspect of the invention, the system includes a door actuator controllably operable for opening and closing a door to the cotton compacting chamber, and a compactor actuator controllably operable for raising and lowering a compactor within the cotton compacting chamber. Each of these apparatus can include, for instance, one or more fluid cylinders or the like. The system includes a connector in connection with the door actuator and the compactor actuator and configured for allowing connecting a remote control device in operative control thereof, respectively. And, the system includes a lockout device in connection with the connector and operable to activate or enable operation of a remote control device connected thereto to controllably operate the compactor actuator only when the door is in a predetermined position, which is preferably, a fully open position.

According to another preferred aspect of the invention, the system includes a switch in an operator cab of the harvester and in connection with an engine and a transmission thereof, the switch being connected in operative control of the connector and being operable to allow operation of the connector only when the engine is operating in an idle mode and the transmission is in a neutral operating mode. It is also preferred that the parking brake be set or engaged.

According to another aspect of the invention, the lockout device can include a limit switch positioned in proximity to the door and configured so as to be in a first operating state when the door is closed and partially open, and in a second operating state when the door is fully open, which is the preferred door position for accessing the compacting chamber.

According to still another aspect of the invention, two of the connectors are provided, and the portable remote control device is operatively connectable to a first of the connectors and is operable using that connector to operate the door to move it to the open or access position, to place the limit switch in the second operating state. The remote control device can then be connected to the now activated second of the connectors, to operate the compactor actuator as required for inspecting, servicing and/or maintaining the compactor.

DETAILED DESCRIPTION OF THE INVENTION

Figure 1:
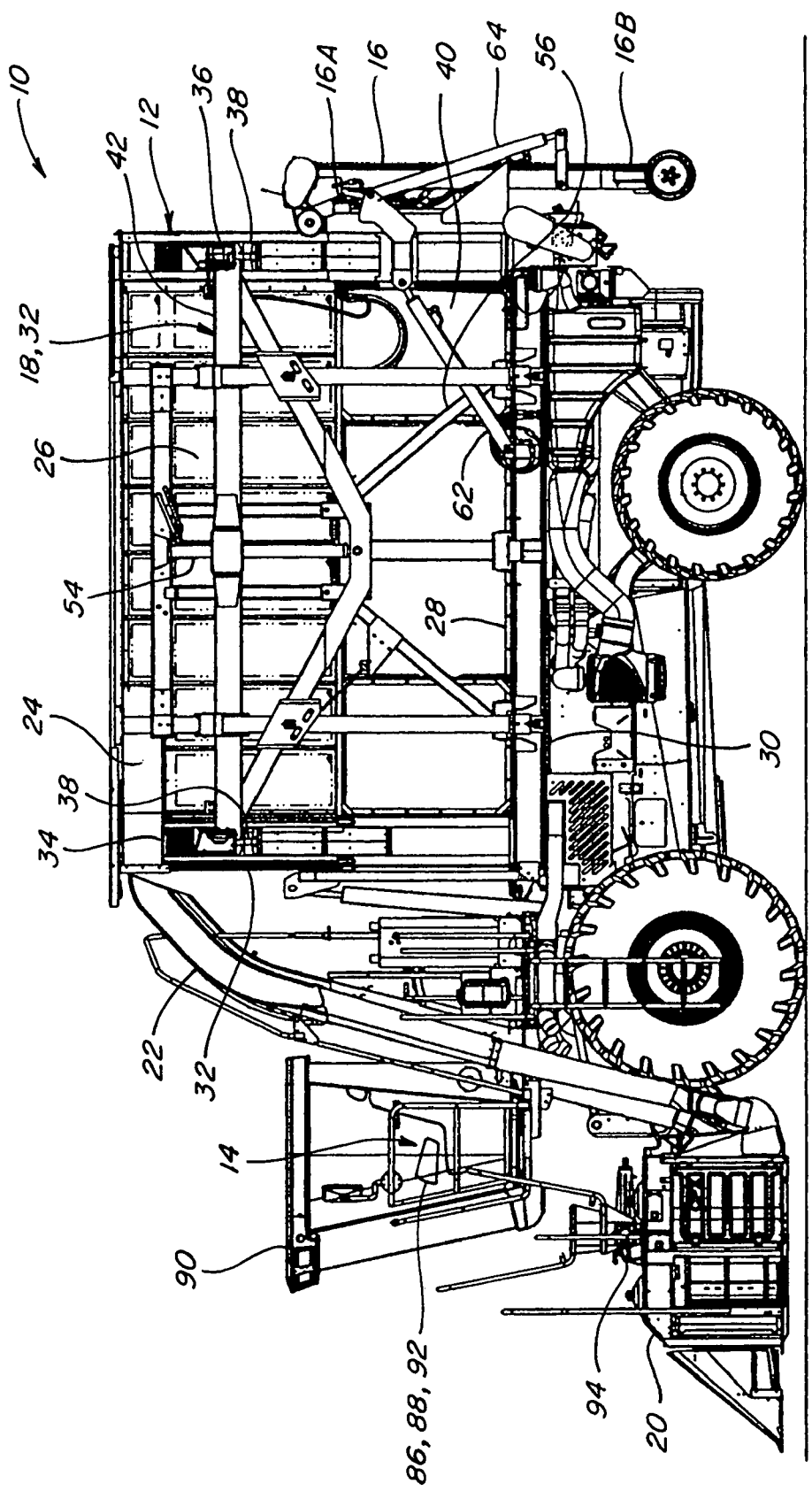
FIG. 1 is a side view of a cotton harvester equipped with an on-board module builder including module compactor apparatus in a raised position therein.
Figure 2:
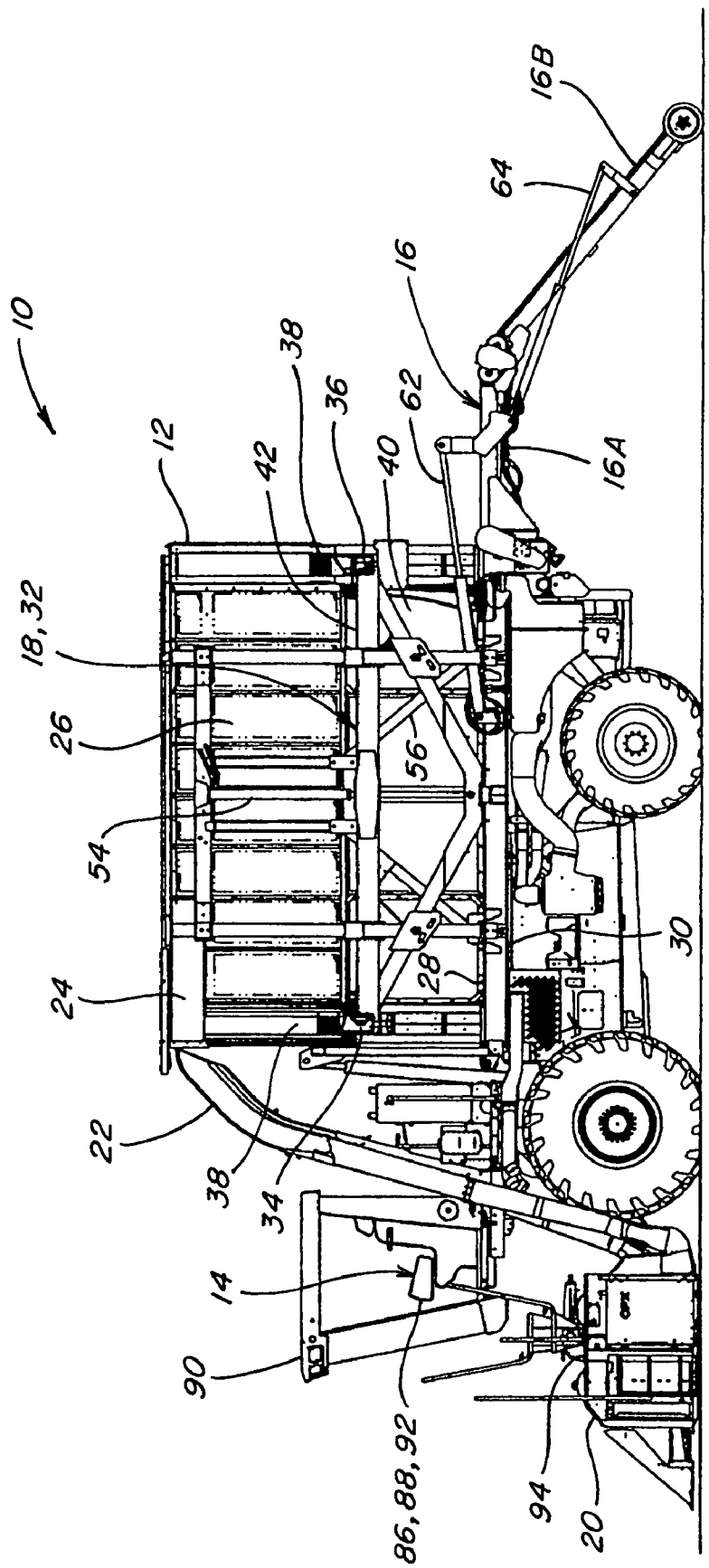
FIG. 2 is another side view of the cotton harvester, showing an unloading door thereof in an open position and the module compactor apparatus in a lowered position within the module builder, both as effected by operation of the invention.
Figure 2A:
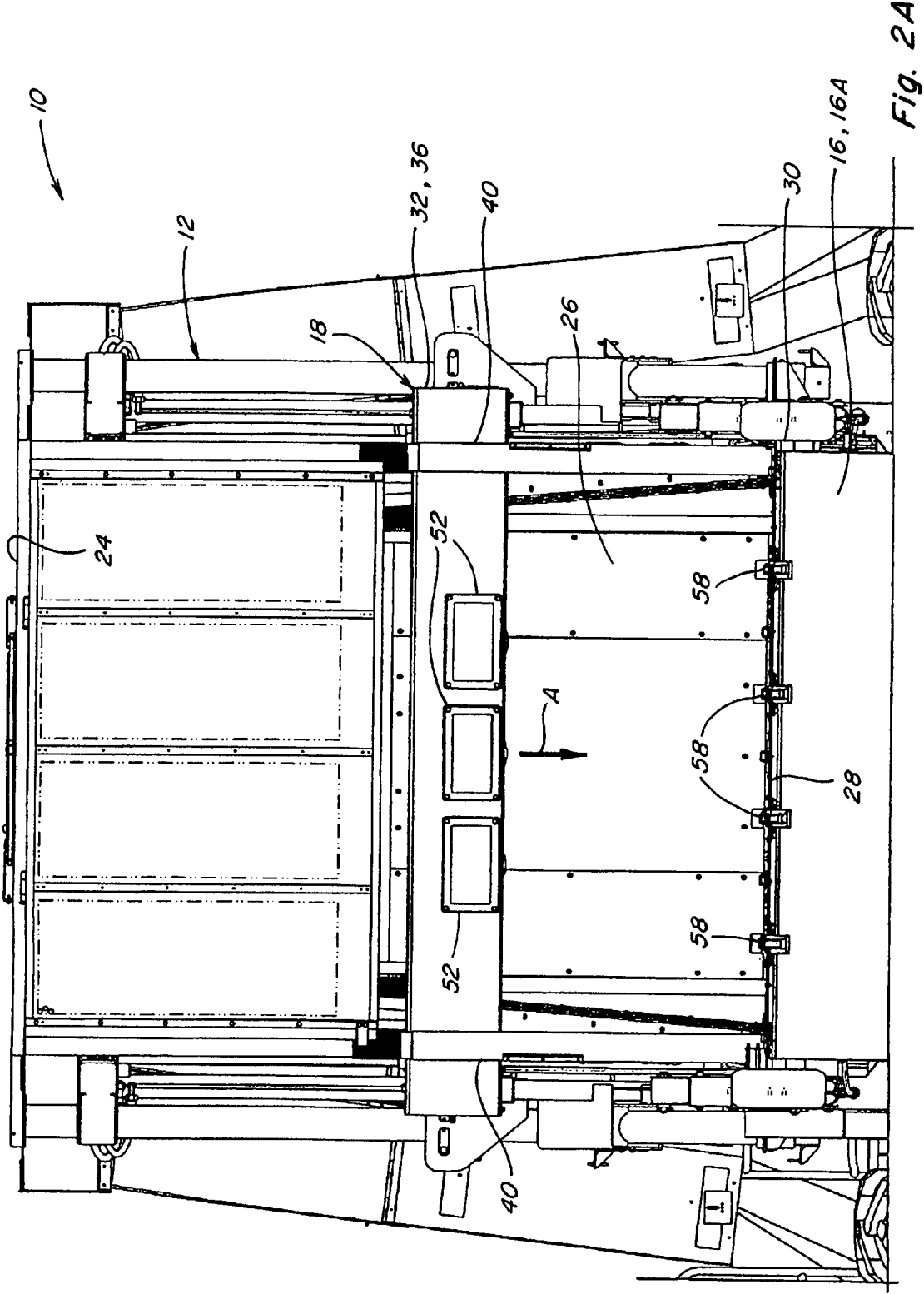
FIG. 2A is a fragmentary rear view of the cotton harvester, showing the unloading door in the open position and the module compactor apparatus in the lowered position through the open door.

Referring now to the drawings, FIGS. 1, 2 and 2A, show a cotton harvester 10 including a cotton module builder 12, and a remote tether control system 14 constructed and operable according to the teachings of the present invention in cooperation with an operator presence system of the harvester, to activate from a remote location, a sequence for opening an unloading door 16 of module builder 12 without activating a module builder tilting function (FIG. 4), and to operate module compactor apparatus 18 of builder 12 with door 16 open, to gain access to a module building chamber of builder 12, and components of apparatus 18 therein, which can include an auger drive and mounting mechanism, as well as other components, for the purpose of inspection, maintenance, and service.

Cotton harvester 10 generally includes a plurality of cotton harvesting units 20 extending across the front end thereof operable for harvesting cotton from cotton plants in the well known manner. The harvested cotton is conveyed by air flows through a plurality of ducts 22 into an upper region 24 of module builder 12. Module builder 12 generally includes an interior cotton compacting chamber 26 in which the cotton (not shown) is collected and compacted by downward movement of compactor apparatus 18, as denoted by arrow A in FIG. 2A. In FIG. 1, compactor apparatus 18 is illustrated in an elevated position within module builder 12, and in FIGS. 2 and 2A, in a lowered position therein. Compactor apparatus 18 is actuated at times during the cotton harvesting operation to distribute the cotton within chamber 26 and compact it against a floor 28 of module builder 12, supported by a horizontal frame 30. Compactor apparatus 18 includes a compactor frame 32 disposed above floor 28, including front and rear cross members 34 and 36, each of which includes opposite end portions which protrude outwardly from chamber 26 through vertical slots 38 (FIGS. 1 and 2) through sides 40 of module builder 12 adjacent the front and rear ends thereof.

Figure 3:
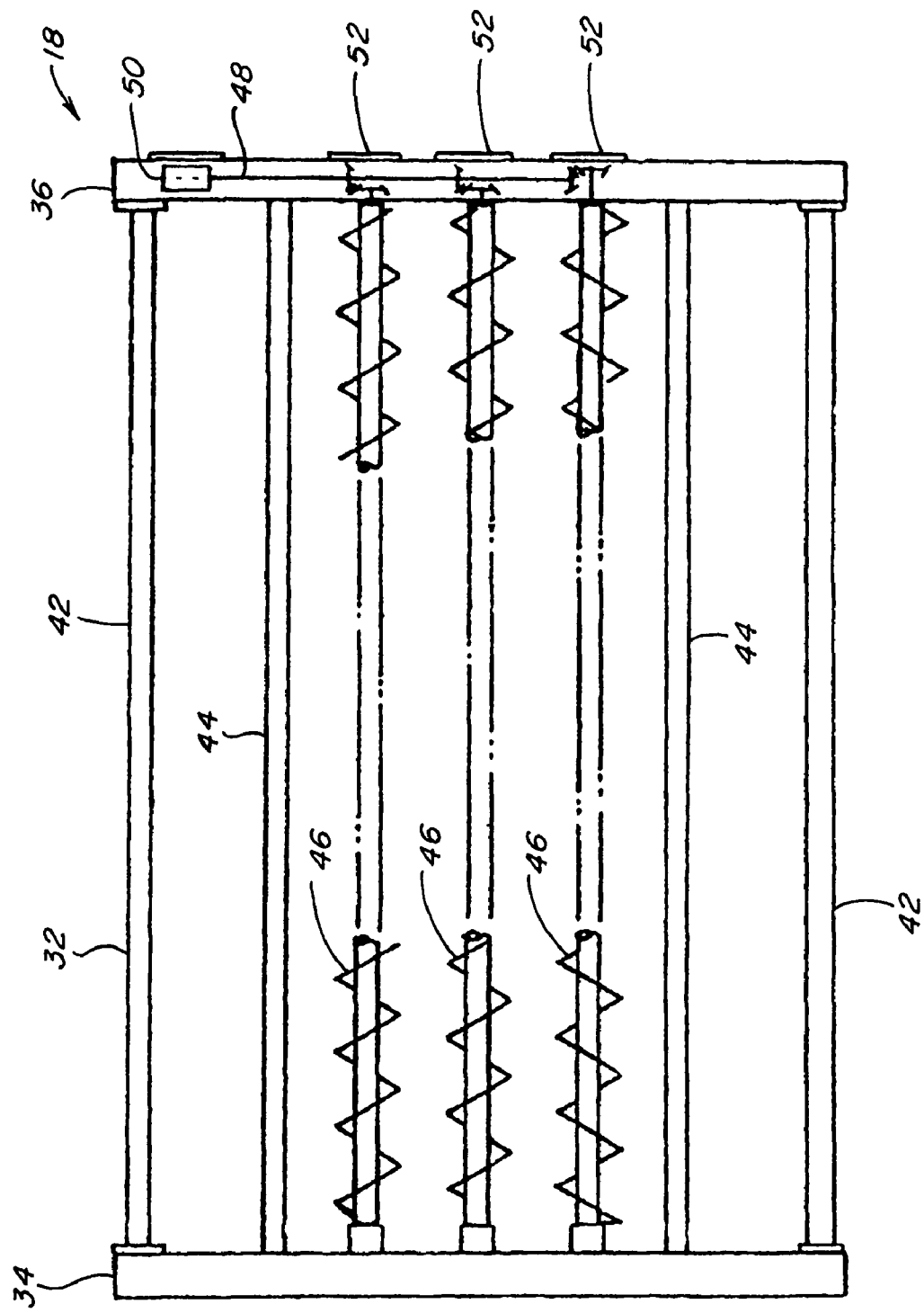
FIG. 3 is a simplified top view of the compactor apparatus.

Referring also to FIG. 3, which is a top view of compactor apparatus, cross members 34 and 36 are connected to and supported by exterior side structures 42 disposed externally of sides 40 of module builder 12, respectively. Interior ribs 44 extend between cross members 34 and 36 so as to be disposed within chamber 26, and a plurality of augers 46 extend between the cross members between interior ribs 44 so as to be disposed within the central region of the compacting chamber. Augers 46 are rotatably driven by an auger drive 48, which can comprise, for instance, a mechanism of shafts and bevel gears rotatably driven by a motor such as a fluid or electric motor 50, all located within rear cross member 36. Several access panels 52 are located on the rearwardly facing surface of cross member 36, and can be removed for accessing drive 48, for such purposes as inspection, maintenance and repair. Motor 50 can be suitably powered, for instance, by a pump of harvester 10, in the well-known manner.

Each exterior side structure 42 of compactor apparatus 18 is connected to and supported for vertical movement (arrow A in FIG. 2A, and in the opposite direction) by a compactor actuator 54, which, in turn, is supported adjacent to the respective side 40 of module builder 12, by a support frame 56. Each compactor actuator 54 preferably comprises a fluid cylinder, and the cylinders are simultaneously extendable for lowering side structures 42, and simultaneously retractable for raising the structures 42, for moving compactor apparatus 18 downwardly and upwardly, respectively, within compacting chamber 26 for distributing and compacting any cotton therein. Pressurized fluid can be provided to actuators 54 by a suitable fluid source, for instance, a pump of harvester 10, also in the well-known manner.

Figure 4:
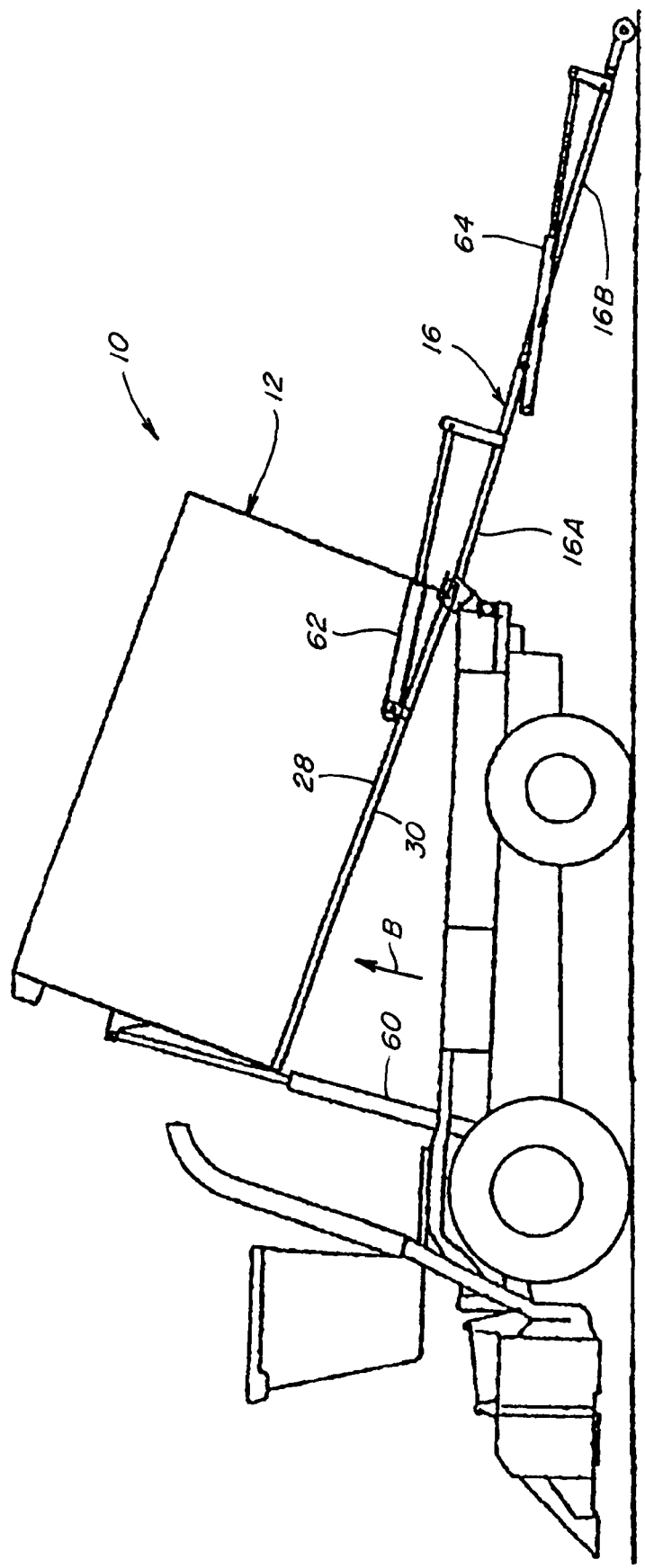
FIG. 4 is a simplified side view of the cotton harvester, showing the module builder in a tilted unloading configuration with the unloading door thereof in an open position forming a ramp extending downwardly and rearwardly from therefrom.

Referring also to FIG. 4, as a well-known practice, when a compacted body or module of cotton within chamber 26 is complete, and at other times, as desired or required, unloading door 16 is unfolded to an open position extending rearwardly in co-planar relation to floor 28, and the front end of module builder 12 is raised relative to harvester 10, to tilt module builder 12 as denoted by arrow B, for unloading the module. Drag chains 58, located on floor 28 and also on the upper surface of door 16, are operated to convey a cotton module thereover and onto a surface therebelow. The tilting of module builder 12 and the opening of door 16 are preferably performed simultaneously as part of an unloading routine which is automatically performed. The unloading routine includes as an initial step, automatically operating the compactor actuators 54 to retract to raise compactor apparatus 18 to its uppermost position within chamber 26. Tilting is effected by a tilt actuator 60 which preferably comprises at least one fluid cylinder. The opening of door 16 is effected by a pair of primary door actuators 62 connected between frame 30 and opposite sides of a primary door segment 16A of door 16, and a pair of secondary door actuators 64 connected between the opposite sides of primary door segment 16A and corresponding sides of a secondary door segment 16B, although it should be recognized that alternative actuator arrangements could be used. Door actuators 62 and 64 also preferably comprise fluid cylinders which receive pressurized fluid from a suitable fluid source on harvester 10, the fluid cylinders being extended to open the door and retracted to close the door. Here, it should be noted that for cotton module builder 12 illustrated, primary door segment 16A, when closed, encloses the open rear end of the module builder, and secondary door segment 16B is pivotally mounted to and located generally rearwardly of primary door segment 16A so as to be unfoldable therefrom to form an elongate ramp therewith extending from floor 28 of the module builder (when tilted) to the ground or other surface located behind and below the module builder for the unloading of cotton modules over the ramp, although it should be recognized that the present invention as described more fully below, can be used with a variety of other door arrangements.

Figure 5:
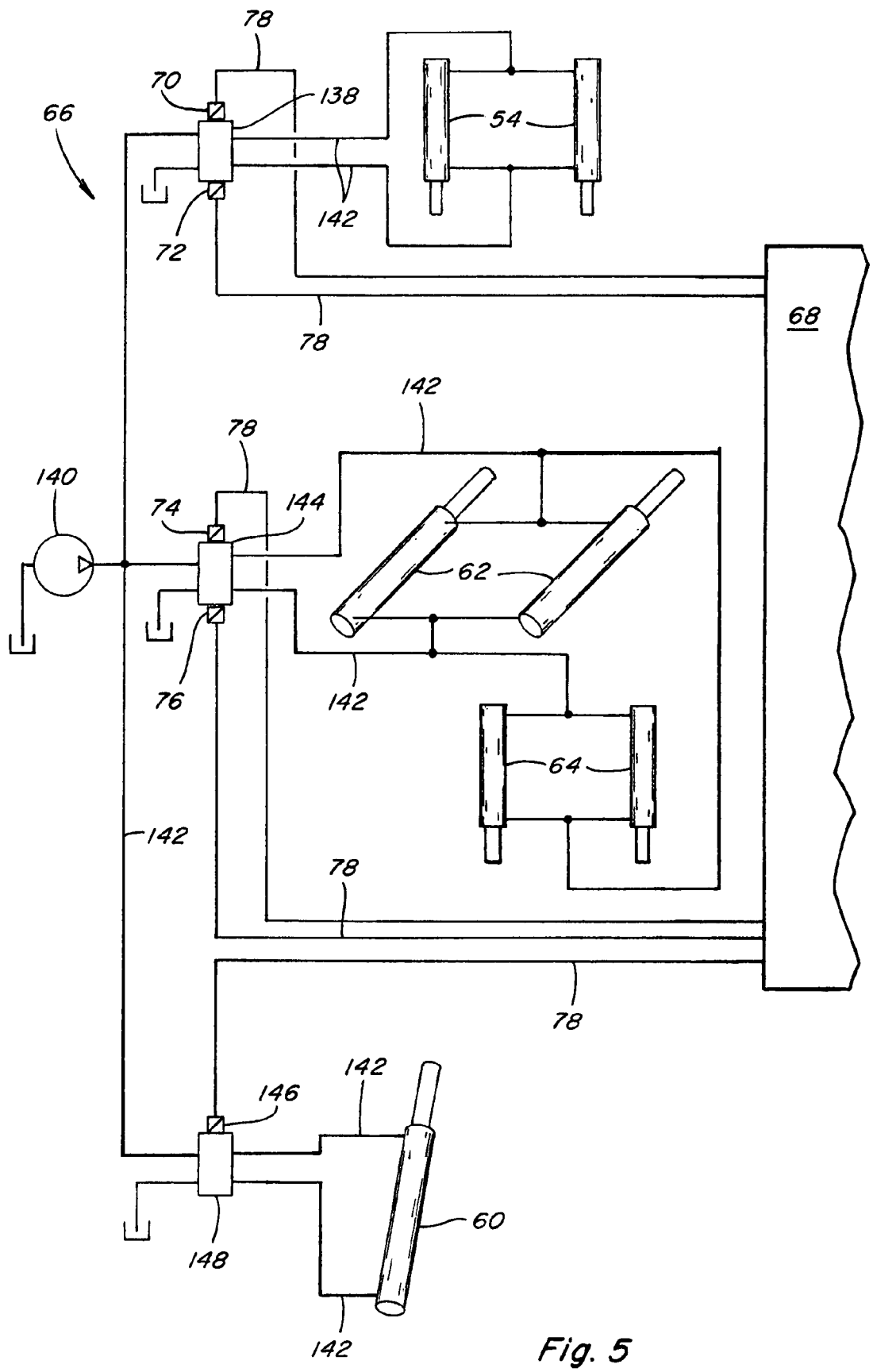
FIG. 5 is a simplified diagram showing aspects of a control system of the module builder.
Figure 5A:
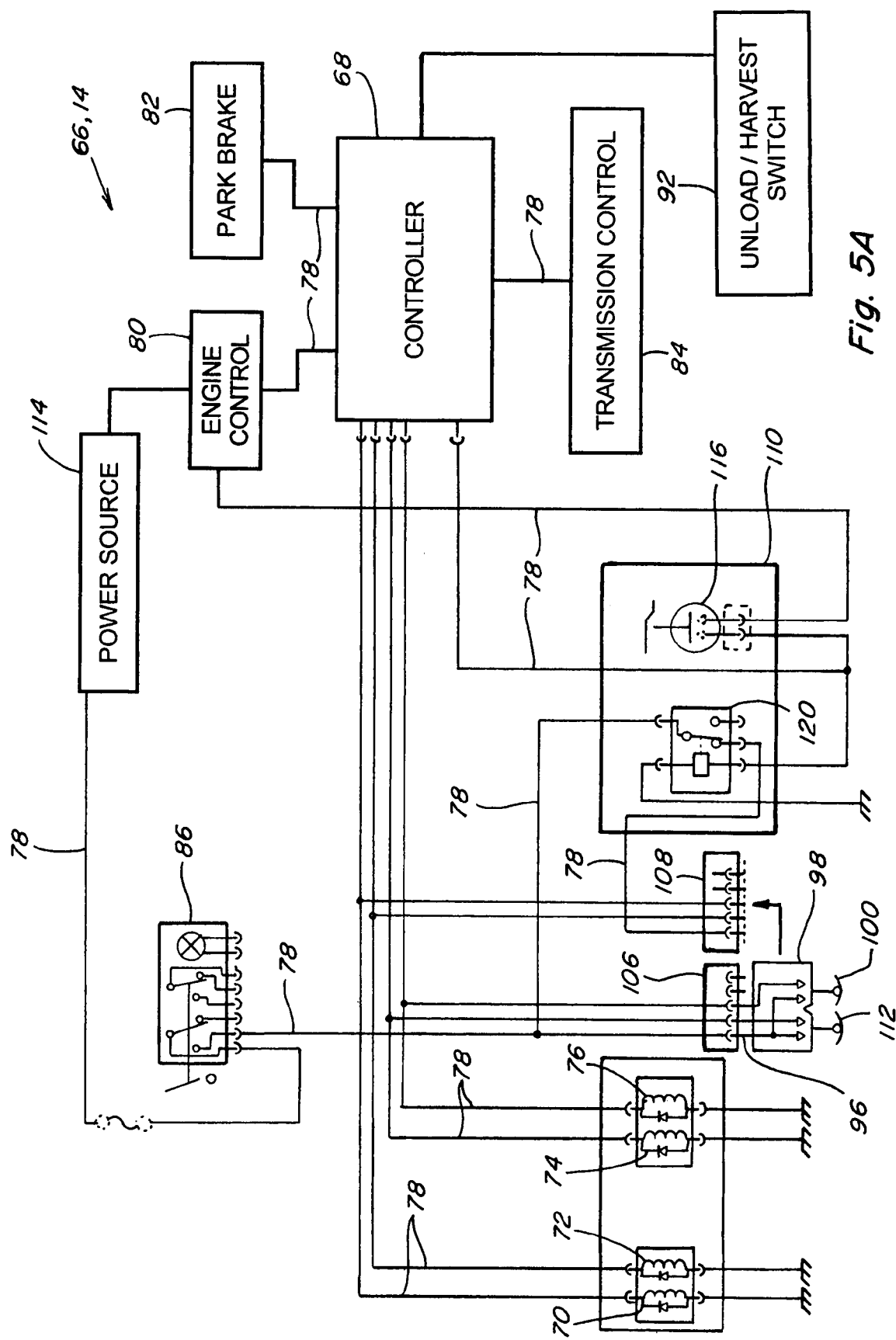
FIG. 5A is another simplified diagram of the control system, showing aspects of the invention incorporated therein.

Referring also to FIGS. 5 and 5A, a basic diagram of aspects of a control system 66 of module builder 12 of harvester 10, and a diagram including modifications to incorporate aspects of remote tether control system 14 of the invention, respectively, are shown. The aspects of system 66, as illustrated in FIG. 5, are automatically operable for controlling the operation of compactor actuators 54 during the compacting routine, and the operation of tilt actuator 60 and door actuators 62 and 64 during the unloading routine, is shown. Control system 66 includes a processor based controller 68 connected in operative control of a compactor raise solenoid 70 energizable for controlling a compactor control valve 138 for directing pressurized fluid flow from a pressurized fluid source 140 and along a fluid path 142, to the lower end of compactor actuators 54 for effecting retraction thereof and thus raising of compactor frame 32; a compactor lower solenoid 72 energizable for controlling valve 138 for directing pressurized fluid flow to the upper ends of compactor actuators 54 for effecting extension thereof and thus the lowering of compactor frame 32; a door open solenoid 74 energizable for controlling a door control valve 144 for effecting pressurized fluid flow along a fluid path 142 to door actuators 62 and 64 for effecting extension thereof and thus opening of door 16; and a door close solenoid 76 energizable for controlling valve 144 for directing pressurized fluid flow along a fluid path 142 to door actuators 62 and 64 for effecting retraction thereof and thus the closing of door 16. Controller 68 is connected to solenoids 70, 72, 74 and 76, by suitable conductive paths 78, such as the wires of a wiring harness of harvester 10, in the well-known manner. Additionally, controller 68 is connected in operative control of a tilt solenoid 146 energizable for controlling a tilt control valve 148 for directing pressurized fluid along a fluid path 142 to a lower end of tilt actuator 60, for tilting module builder 12, at an appropriate time during the unloading routine.

Figure 6:
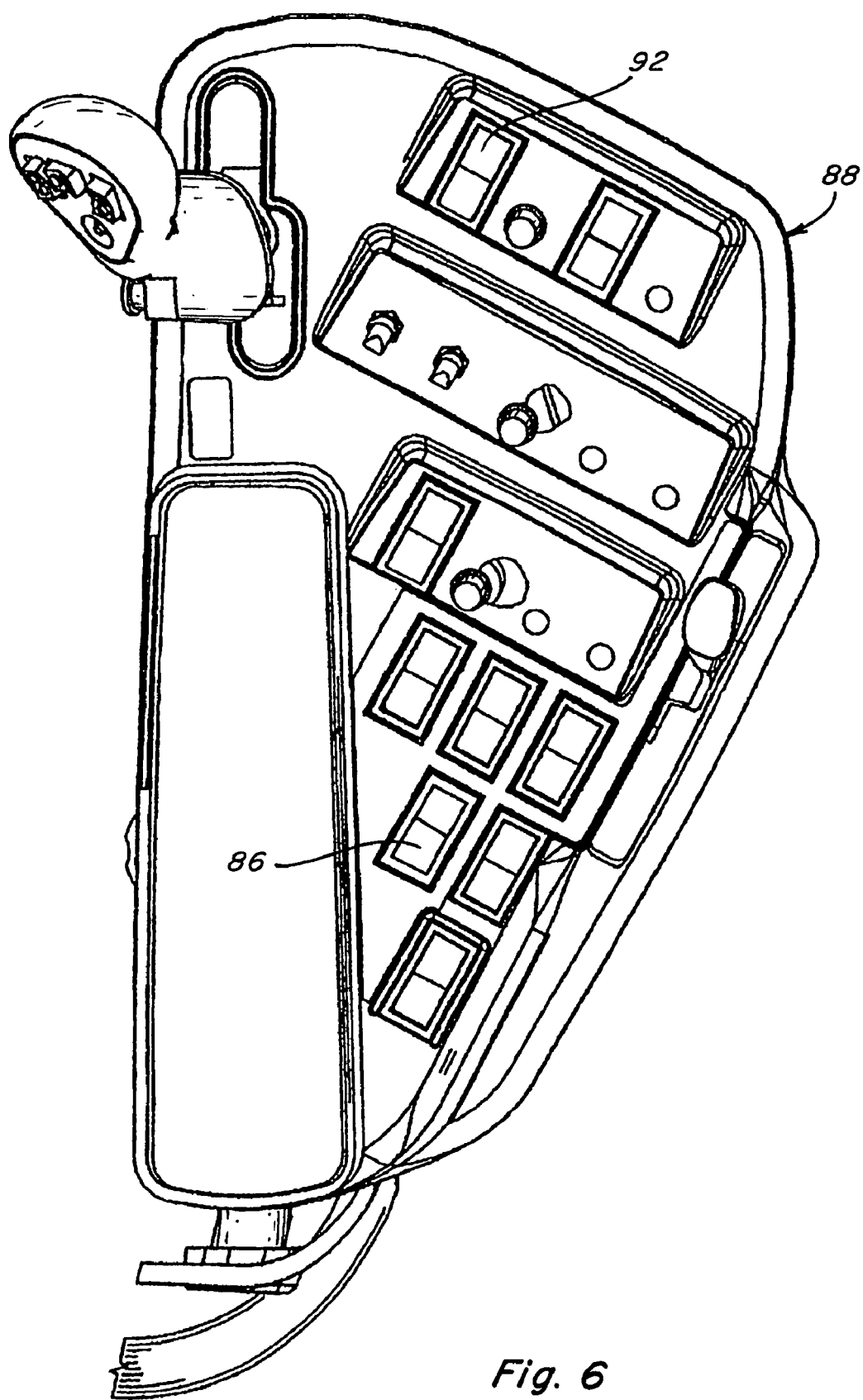
FIG. 6 is a top view of an operator console of the harvester.

Referring more particularly to FIG. 5A, control system 66 also interfaces over suitable conductive paths 78 with various other systems of harvester 10, including an engine control 80, a transmission control 82, and a park brake 84. Still further, control system 66 interfaces with an operator presence system or OPS, which includes an operator presence system service switch 86 and other components such as a seat switch (not shown), and which also interfaces with engine control 78, transmission control 80 and park brake 82. Referring more particularly to FIGS. 1 and 2, and additionally to FIG. 6, operator presence system service switch 86 is preferably located on an operator console 88, located within an operator cab 90 of harvester 10. Console 88 additionally includes an unload/harvest switch 92, which enables an operator to select an operating mode for module builder 12.

Addressing unload/harvest switch 92 first, when an operator switches switch 92 to the harvest mode, controller 68 is automatically operable to alternatingly energize compactor raise and lower solenoids 70 and 72, for moving compactor apparatus 18 as required for performing cotton compacting routines. This can be done periodically, or responsive to cotton levels in chamber 26. Controller 68 is also connected in operative control of auger solenoids (not shown) operable for controlling operation of auger drive 48 in the well-known manner, for rotating augers 46 for distributing the cotton as part of the compacting routines. When switch 92 is switched to the unload mode, controller 68 is automatically operable to move compactor apparatus to a raised position, then to operate door open solenoid 74 to open door 16, and actuate tilt actuator 60, for tilting module builder 12 to an unload position, as shown in FIG. 4. Drag chains 58 will then be operated for unloading a cotton module from the module builder.

Figure 7:
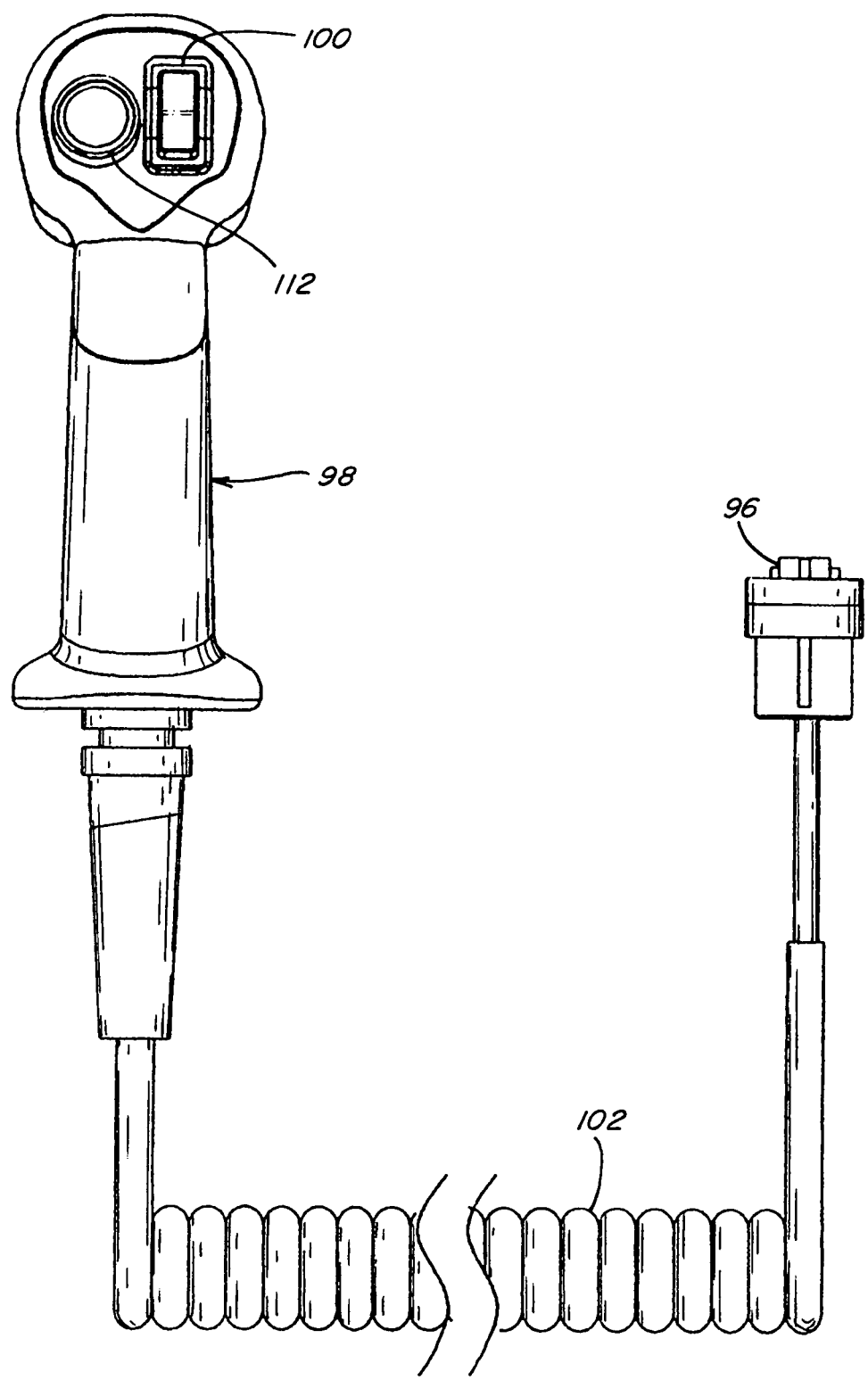
FIG. 7 is a side view of a tether control handle of the invention.

Turning to the OPS, a common function of the OPS when activated, is to disable the functions of the harvesting units 20 for service, maintenance and/or inspection, under certain prescribed conditions, here, when the transmission of the harvester is in neutral, the engine is at idle, the parking brake is engaged, and the operator leaves the seat for any reason. With the OPS activated, the operator can operate OPS service switch 86 to power a service connector 94 that is located in a service box on one of the harvesting units. Referring also to FIG. 7, the operator can then connect a connector 96 of a tether control handle 98, to service connector 94, and using a switch 100 on handle 98, manually operate the harvesting unit's drive functions while standing on the ground next to the unit. A cord connecting tether control handle 98 to connector 96 is of sufficient length to enable the operator walk to each of harvesting units 20, to allow the operator to inspect, perform maintenance, or service each or any of the harvesting units.

As noted above, according to the invention, remote tether control system 14 is operable in cooperation with the OPS, to activate from a remote location, a sequence for opening at least primary door segment 16A of unloading door 16 of module builder 12 without tilting the module builder, to allow an operator to gain access to cotton compacting chamber 26, and components of apparatus 18 therein, including auger drive 48, as well as other components, for inspection, maintenance, and service. System 14 is also operable to enable the operator to operate compactor apparatus 18 to move it to a desired height within the chamber, for inspection, maintenance, and service. To provide these capabilities, system 14 preferably utilizes tether control handle 98, in cooperation with the OPS, to actuate from a remote location, at least door actuators 62, as required, to open primary door segment 16A to its fully open position, but without actuating tilt actuator 60, such that module builder 12 remains in its harvest position on frame 30, as shown in FIG. 2.

Figure 8:
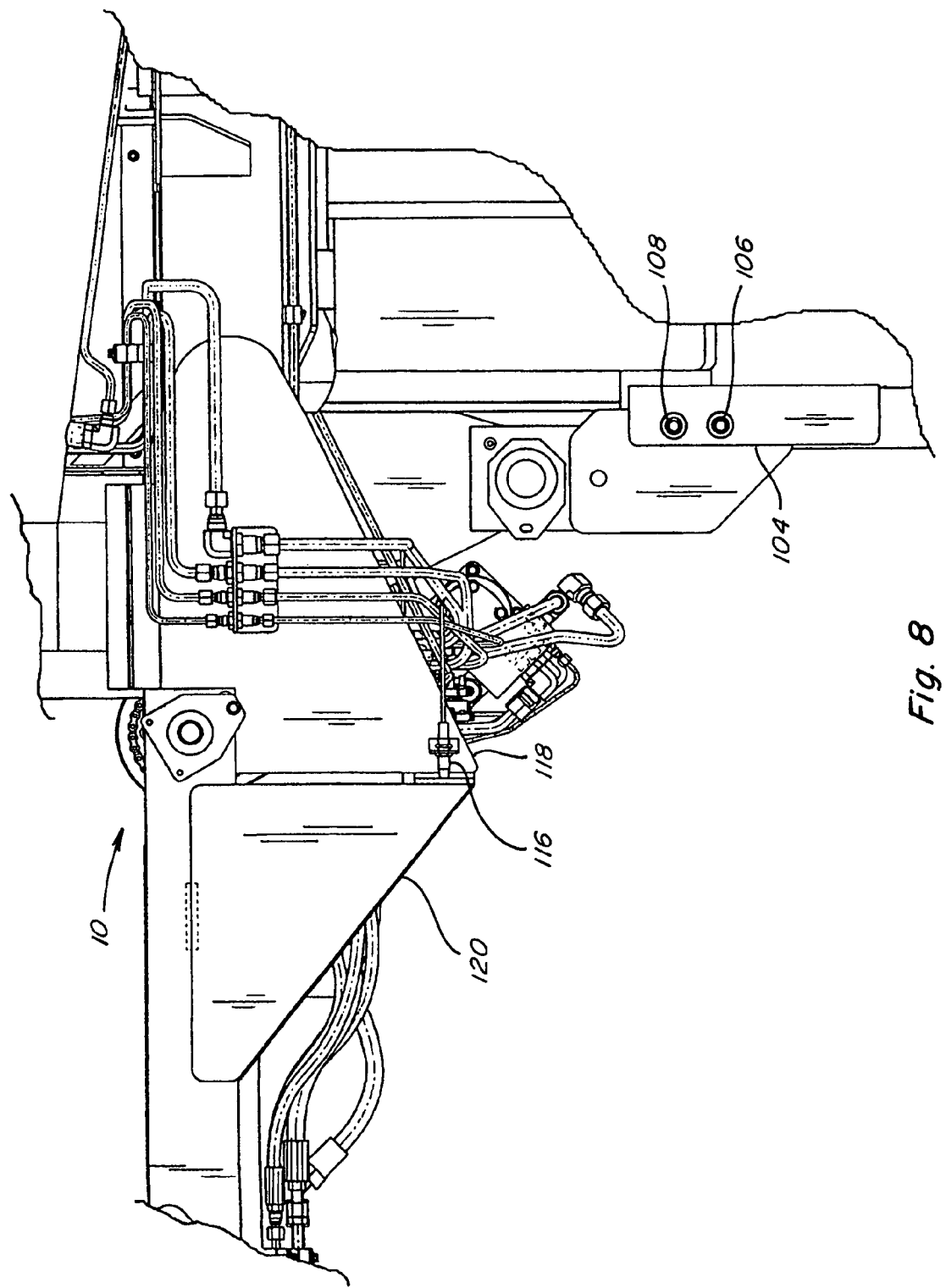
FIG. 8 is an enlarged fragmentary right side view of the right side of the rear end of the module builder, showing apparatus of the invention.

Preferred elements of system 14 include a service center station 104, preferably located on the rear right side of frame 30, as shown in FIG. 8. Service center station 104 contains two connectors, each of which is adapted and configured for connection to connector 96 of tether control handle 98 thereto. The lower connector 106 is connected by conductive paths 78 to door open and close solenoids 74 and 76 and thus is configured as a door open/close connector, and the upper connector 108 is connected to compactor raise and lower solenoids and thus is configured as a module compactor raise/lower connector. The connectors also preferably have a removable dust cap or caps for protection from the environment. System 14 is configured so that to service the rear of the harvester as mentioned, the operator will first set the OPS by placing the harvester's transmission in neutral, placing the engine throttle at idle position, and engaging the parking brake. This immobilizes the harvester. The operator activates connector 106 of remote tether system 14 by placing OPS service switch 86 in its on position, and unload/harvest switch 92 in its unload position. All this can be performed while the operator is seated in the cab.

The operator can then exit the cab and proceed to service center station 104, or another person can perform the next step, which is to connect connector 96 to lower connector 106, which will enable controlling door 16 using tether control handle 98. Door 16 can now be opened to the position shown in FIG. 2, using handle 98. As noted above, as part of the remote control tether system configuration, tilt actuator 60 is not connected to either lower connector 106 or upper connector 108, so as to effectively be locked out, such that, unlike in the normal unload routine wherein module builder 12 is tilted, in this routine, this does not occur. Instead, switch 110 and another switch 112 on handle 98, are enabled by receiving power from a power source 114 of harvester 10, via OPS service switch 86 and suitable conductive paths 78, so as to be operable to open and close primary door segment 16A. Door segment 16A will be opened to extend in the rearward direction from module builder 12 in at least generally coplanar relation to floor 28. Since a cotton module is not to be unloaded, a continuous, flat ramp is not required, and secondary door segment 16B can be suitably positioned in relation to door segment 16A so as to extend downwardly to whatever surface is located therebelow, such as illustrated. For instance, solenoids 74 and 76 can be configured to operate both door actuators 62 and 64, but to cease operation thereof when primary door segment 16A is unfolded to its fully open position. This full opening of primary door segment 16A is sufficient to allow an operator to gain access to the rear, open end of cotton compacting chamber 26, by climbing up angled secondary door segment 16B, or to climb directly onto open door segment 16A using a stepladder or the like.

Remote tether system 14 additionally includes a lockout device 110, the state of which must be changed to enable operation of compactor raise and lower solenoids 70 and 72. Preferably lockout device 110 only allows operation of solenoids 70 and 72 when primary door segment 16A is in its fully open position (FIG. 2). This is preferably achieved using a limit switch 116, disposed on a door stop 118 of frame 30 and positioned to be abutted by a triangular brace 120 on door segment 16A when that door segment is fully open. Limit switch 116 is preferably configured so as to be in an open state when door segment 16A is in any position other than the fully open position, and to be in a closed state when door segment 16A is fully closed. Limit switch 116 is connected by a suitable conductive path 78 to power source 114, and to a relay 120 of lockout device 110, so as to direct power from power source 114 to the relay when switch 116 is in the closed state. Relay 120 is energized by the power directed thereto through switch 116, and is also connected to power source 114 through OPS service switch 86, such that, when energized, relay 120 will direct the power received through switch 86 to upper connector 108 via a suitable conductive path 78 connected therebetween. Tether control handle 98 can then be disconnected from lower connector 106 such that door 16 will remain in the position shown in FIG. 2, and handle 98 can now be connected to upper connector 108, to disable operation of door solenoids 74 and 76, and enable operation of compactor raise and lower solenoids 70 and 72 using switches 100 and 112. For convenience, this can be done while the operator or other person is standing on the ground next to service center station 104, and tether control handle 98 can be placed on primary door segment 16A so as to be within reach when the operator climbs onto that surface. Now, the operator, while standing on door segment 16A, or at another location, can operate switches 100 and 112 on handle 98, to move compactor apparatus 18 to a desired position, such as that shown in FIG. 2A.

With compactor apparatus 18 positioned as desired, the operator can gain access to auger drive 48 by removing access panels 52 as required, for inspection, maintenance, and service. The operator can also further lower, or raise compactor apparatus 18 as desired. For instance, the operator may wish to raise the compactor apparatus in order to enter chamber 26 to inspect and/or service augers 46 and other components located in the chamber, and/or clean the interior, such as by removing accumulated linters and the like.

After the above inspection and/or service has been completed, the operator can depress switch 112 to raise compactor apparatus 18, or leave it in a lowered position. This is because when unload/harvest switch 92 is later switched from the unloading position to the harvest position, the compactor will automatically move where it needs to be for that particular mode.

At this point, if the operator has completed the needed work in the interior of module builder 12, and can climb down from open primary door segment 16A. Tether control handle 98 can then be disconnected from connector 108 and reconnected with connector 106, and be operated to close door 16, to render harvester 10 ready to resume harvesting operation.

Figure 9:
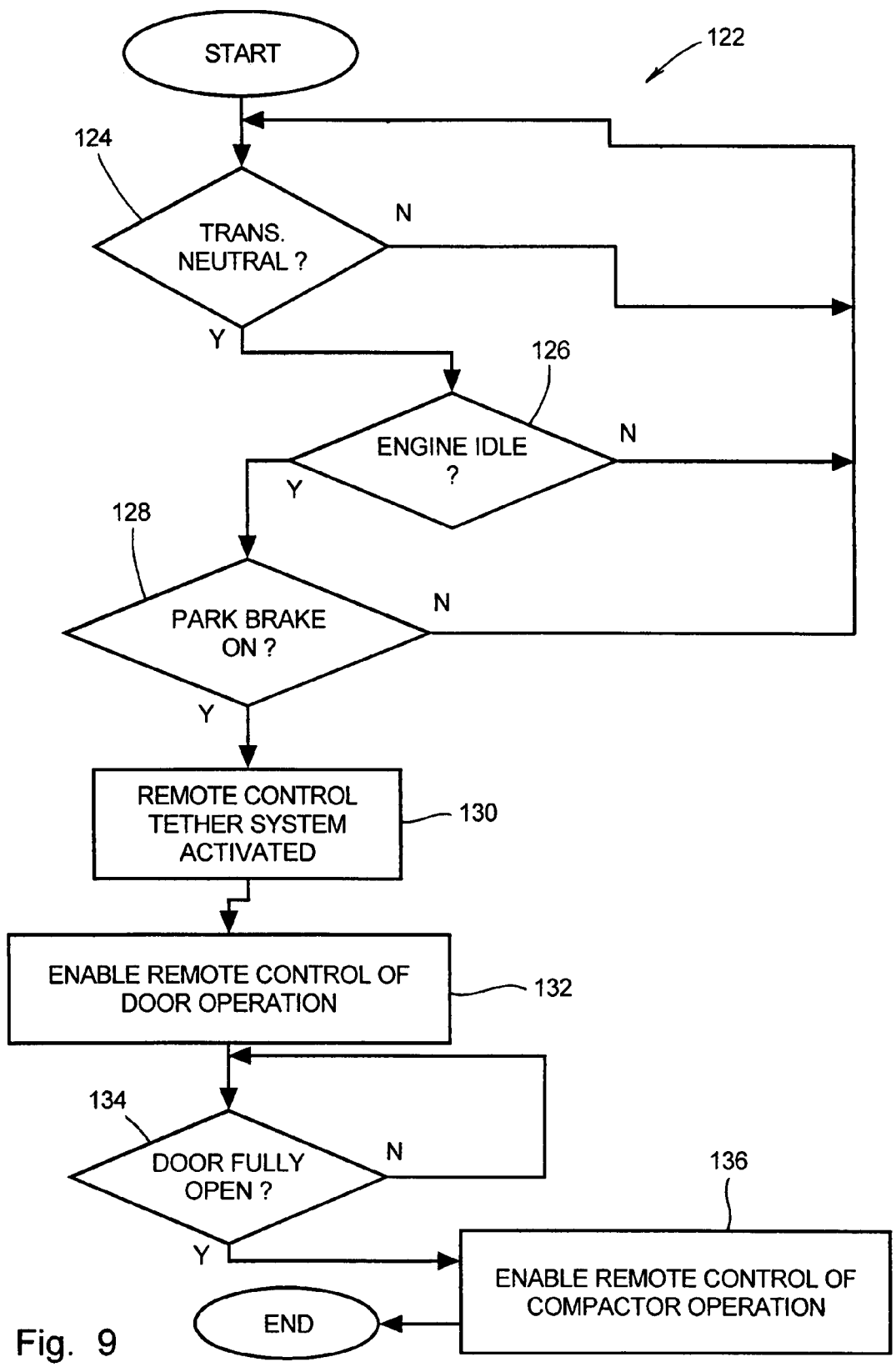
FIG. 9 is a high level flow diagram showing aspects of a method of the invention.

Also referring to FIG. 9, a high level flow diagram 122 including steps of a representative embodiment of a method of the invention for initiating operation of the remote control tether system, is shown. As illustrated in decision blocks 124, 126, and 128, certain conditions must be met, here, the transmission of harvester 10 must be in neutral, the engine must be at idle, and the park brake must be on. And, as denoted by block 130, and as explained above, OPS service switch 86 must be turned on, and unload/harvest switch 92 must be in the unload position, to activate the remote control tether system. At this time, remote control of operation of door 16 is enabled, as denoted at block 132. As denoted in decision block 134 and block 136, remote control of compactor operation is only enabled when the door is fully open. Actual operation of the compactor is only effected when handle 98 is connected to the appropriate connector, as explained above.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A system for enabling accessing the interior of a cotton compacting chamber of a cotton harvester, comprising:
   a door actuator controllably operable for opening and closing a door to the cotton compacting chamber;
   a compactor actuator controllably operable for raising and lowering a compactor within the cotton compacting chamber;
   a connector device in connection with the door actuator and the compactor actuator and configured for allowing connecting a remote control device, wherein the connector device includes a first connector, for connecting the remote control device in operative control of the door actuator, and a second connector, configured for connecting the remote control device operative control of the compactor actuator,
   a lockout device in connection with the connector device and operable to enable operation of the remote control device connected thereto to controllably operate the compactor actuator only when the door is in a predetermined position, wherein the predetermined position comprises a fully open position, and the lockout device includes a limit switch disposed on the cotton compacting chamber and positioned for abuttment against the door when the door is in the predetermined position, wherein the limit switch is electrically coupled to the first and second connectors, the limit switch configured so as to be in a first operating state when the door is not in the predetermined position so as to energize operation of the first connector to controllably operate the door actuator and disable operation of the second connector to prevent operation of the compactor actuator, and the limit switch being changed to a second operating state by positioning of the door in the predetermined position, to energize operation of the second connector to controllably operate the compactor actuator and disable operation of the first connector to prevent operation of the door actuator.

2. The system of claim 1, wherein the limit switch being operable to enable operation of the connector device only when at least one predetermined condition is present.

3. The system of claim 2, wherein the at least one predetermined condition comprises an engine of the harvester operating in an idle mode, and a transmission of the harvester being in a neutral operating mode.

4. The system of claim 2, wherein the at least one predetermined condition comprises a park brake of the harvester being engaged.

5. The system of claim 1, wherein the remote control device is a portable remote control device operatively connectable to the connector device.

6. The system of claim 1, wherein the connectors are located on the harvester adjacent to the door.

* * * * *